United States Patent [19]
van Zeeland et al.

[11] Patent Number: 5,967,381
[45] Date of Patent: Oct. 19, 1999

[54] DISPENSING APPARATUS AND CONTAINER

[75] Inventors: Gregory Russell van Zeeland; Damian Anthony Kelly, both of Morningside, Australia

[73] Assignee: Gregory Russell van Zeeland, Queensland, Australia

[21] Appl. No.: 08/945,194

[22] PCT Filed: Apr. 24, 1996

[86] PCT No.: PCT/AU96/00241

§ 371 Date: Oct. 23, 1997

§ 102(e) Date: Oct. 23, 1997

[87] PCT Pub. No.: WO96/33928

PCT Pub. Date: Oct. 31, 1996

[51] Int. Cl.⁶ .......................... B65D 83/76; B65D 85/78; A23G 9/28
[52] U.S. Cl. .......................... 222/325; 222/327; 222/333; 222/185.1
[58] Field of Search ................................. 222/185.1, 325, 222/327, 333, 372, 146.6

[56] References Cited

U.S. PATENT DOCUMENTS

| | | |
|---|---|---|
| 2,568,293 | 9/1951 | Nelson . |
| 2,716,385 | 8/1955 | Tarr . |
| 5,069,364 | 12/1991 | McGill . |
| 5,620,115 | 4/1997 | McGill . |

FOREIGN PATENT DOCUMENTS

| | | |
|---|---|---|
| 247567 | 5/1963 | Australia . |
| 28107/89 | 7/1989 | Australia . |
| 47435/90 | 6/1990 | Australia . |
| 49988/90 | 8/1990 | Australia . |
| 509967 | 10/1992 | European Pat. Off. . |
| 41 18 225 | 12/1992 | Germany . |
| 42 29 588 | 3/1994 | Germany . |
| 992 262 | 5/1965 | United Kingdom . |
| 2 230 057 | 10/1990 | United Kingdom . |
| 89/05096 | 6/1989 | WIPO . |
| 90/07280 | 7/1990 | WIPO . |
| 91/01090 | 2/1991 | WIPO . |
| 94/13154 | 6/1994 | WIPO . |
| 94/14333 | 7/1994 | WIPO . |
| 94/15856 | 7/1994 | WIPO . |

Primary Examiner—Andres Kashnikow
Assistant Examiner—David Deal
Attorney, Agent, or Firm—Renner, Otto, Boisselle & Sklar, P.L.L.

[57] ABSTRACT

A dispensing apparatus for dispensing contents from a container. The container rests upon a support in the apparatus and has an outlet at one end from which contents are directly dispersed and cover at its other end. The apparatus has a ram with a ram member engageable against the cover to move the cover between a first position adjacent the other end to a position adjacent the outlet to dispense contents from the container. The pressure exerted on the cover by the ram member is released after a dispensing operation.

15 Claims, 8 Drawing Sheets

DISPENSING APPARATUS AND CONTAINER

FIELD OF THE INVENTION

THIS INVENTION relates to an improved dispensing apparatus. In particular, the invention concerns a frozen confection dispensing apparatus. The invention will be described by way of example with reference to an apparatus for dispensing a frozen soft serve confection. It should be appreciated that the apparatus of the invention may be used for dispensing other foodstuffs.

BACKGROUND OF THE INVENTION

Australian patent specification 633038 discloses a frozen confection dispensing apparatus employing a collapsible container for holding the frozen confection. The container is not self supporting and is received in a hollow casing. A bellows arrangement is under constant pressurisation and acts upon the container to dispense confection from the container. The container has an outlet which is coupled via a dispensing conduit to a dispensing valve. This apparatus includes means for tempering frozen confection in the container to transform the confection from a hard frozen condition at a first sub-freezing temperature to a soft serve condition at a higher second sub-freezing temperature. Thermal insulation is disclosed for maintaining the container at the second temperature.

With such an arrangement a dispensive valve is necessary and requires periodic cleaning. This apparatus is not particularly effective in dispensing confection having entrained solid particles such as pieces of nuts or the like. Such solids tend to adversely affect the operation of the valve. The container needs to be supported by a hollow casing and thus adds to the complexity of the apparatus. The dispensing conduit requires regular cleaning.

The pressure applied to the container by the bellows is constant and not relaxed between serves. Soft serve confection is aerated to give it a desired consistency and quality. The application of constant pressure on the container leads to loss of this aeration and overrun during dispensing. Thus results in wastage and deterioration of the iced confection.

Australian patent specification 618979 discloses another dispensing apparatus for frozen confection. The apparatus of this patent specification suffers from the same disadvantages as the apparatus of the specification just discussed. The apparatus of specification 618979 has a bellows shaped dispensing container from which the contents is dispensed via a passage terminated in a dispensing valve. The bellows shaped container does not allow all of its contents to be dispensed and wastage also occurs for this reason.

Australian patent specification 577058/94 discloses yet another apparatus for dispensing soft serve frozen confection. That apparatus employs a container having a deformable upper portion and has an integrally formed outlet from which contents within the container may be directly dispensed by application of pressure on the upper portion of the container by a plunger. The outlet is normally sealed by a cover which is removed prior to commencing a dispensing operation. Once again, the plunger functions continuously pressurise the container.

It is an object of the present invention to provide a dispensing apparatus which at least minimises some of the disadvantages referred to above.

DISCLOSURE OF THE INVENTION

According to one aspect of the invention there is provided a container from which contents may be dispensed, the container including a body, a lower wall at one end of the body, a dispensing outlet in the lower wall and a cover extending across the other end of the body spaced from the lower wall and movable between a first position adjacent the other end to a final position adjacent the one end to dispense contents from the container whereby a periphery of the cover remains in contact with an interior wall of the body as it moves between the first and the second positions.

The body may have any desired transverse cross sectional shape. The periphery of the cover conforms to that peripheral shape. It is preferred that the body be circular in transverse cross sectional shape and in which case the periphery of the cover is also circular. The body is tapered such that the lower wall at the one end is smaller in area than the other end.

The dispensing outlet in the lower wall is preferably offset from a central location in the lower wall. The outlet may have a cap which normally seals the outlet prior to the dispensing of contents from the container. Alternatively, the outlet may be provided by frangible sections normally connected to each other and severable from each other but remaining hinged to the lower wall to allow contents to be dispensed. As an alternative to frangible sections a frangible or rupturable membrane may be present in the lower wall for allowing contents to be dispensed.

The cover has a hinged peripheral lip extending around it for contacting the interior wall of the body. As the cover is driven into and along the body and towards the lower wall, the lip hinges relative to the remainder of the cover. In this way, the effective area defined by the cover matches the transverse area of the body as the cover moves from the larger to the smaller end of the body.

If desired, a lid may be fitted to the other end of the body to shield the cover during transport and storage of the container. The lid may be removed to enable the cover to be moved in the manner described to effect dispensing. The lid may be fixed to the body with a tamper evident seal.

According to another aspect of the invention, there is provided a dispensing apparatus including a housing having a support for a container of the type described above, a ram having a ram member movable into engagement with the container to dispense contents therefrom and to a position where pressure is released from the container after a dispensing operation and a refrigeration system for cooling the interior of the housing.

The ram may be driven in any suitable way. For example a mechanical drive such as a screw drive or a pneumatic or hydraulic drive may be used. A hydraulic drive is preferred. The ram may be a hydraulic cylinder assembly and the ram member may comprise a plate adapted to engage the cover of the container. The drive ensures that after a dispensing operation has been completed, the ram member is withdrawn to relieve pressure on the container. In this way the tendency for soft serve ice cream in the container becoming flat is minimised.

Preferably force draft cooling is employed. Force draft refrigeration is achieved by employing a system including a fan and refrigeration unit adjacent the container. Preferably the housing is divided into two spaces and the container is located in one of these. One space may house a condensing unit of the refrigeration system while the space for the container may house a cross fin coil and fan for the force draft refrigeration. The control circuitry for the hydraulic drive may be housed in the one space within the housing.

DISCLOSURE OF THE DRAWINGS

Particular preferred embodiments of the invention will now be described by way of example with reference to the drawings in which.

DETAILED DESCRIPTION OF THE DRAWINGS

Figure 1:
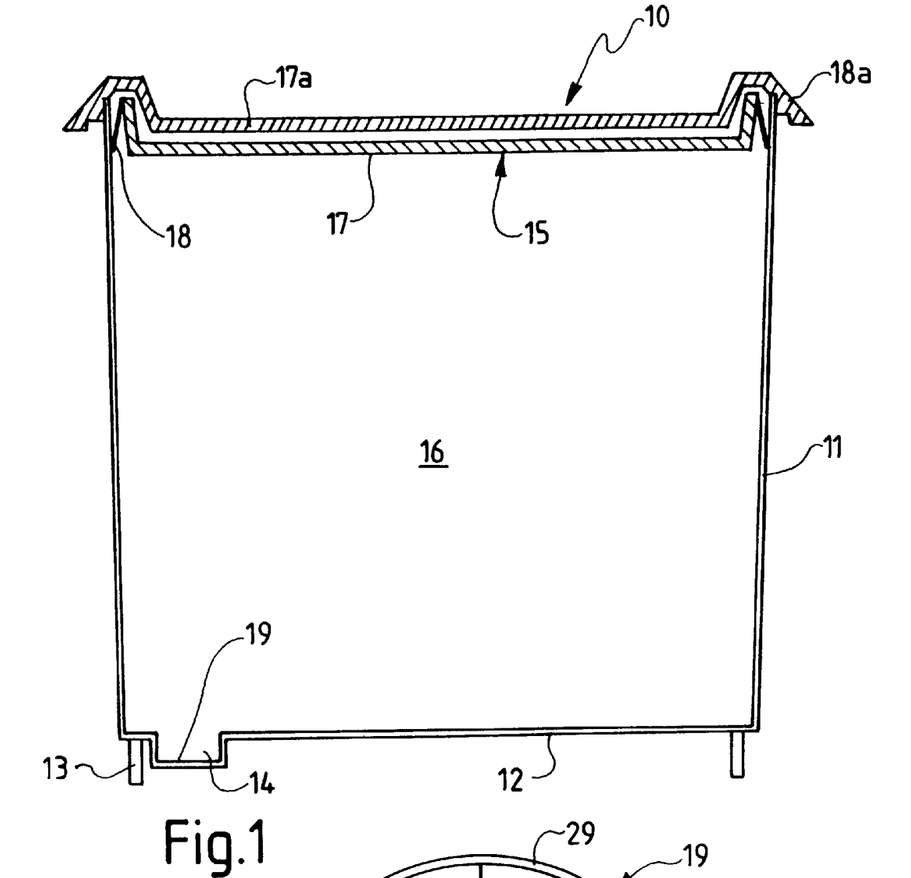
FIG. 1 is a vertical sectional view of a container according to an embodiment of the invention.

FIG. 1 shows a container 10. The container has a tapered body 11 so that a plurality of like configured bodies or empty containers may be stacked together. A Lower wall 12 extends across one end of the body 11. Lip 13 extends around the wall 12 and spaces the wall 12 from a surface upon which the container 10 may be placed An outlet 14 extends from the wall 12 and is offset from the centre of the wall 12. Although outlet 14 is shown as a spigot it may be substantially flush or in the same plane as the wall 12.

A cover 15 extends across the other end of the body 11 to close off a space 16 within the body for retaining contents to be dispensed from the outlet 14. The cover 15 has a main portion 17 around the periphery of which is hinged a lip 18. The lip ensures that the cover seals the container throughout its movement from the position shown to its final position adjacent the innerface of wall 12.

Figure 2:
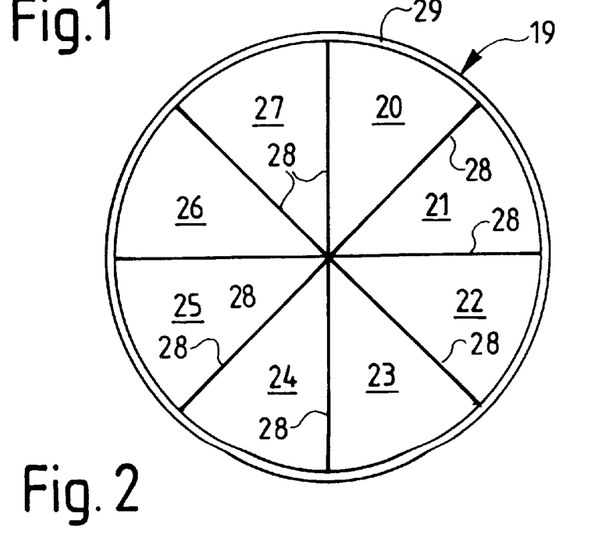
FIG. 2 is a detailed view of an outlet from the container of FIG. 1.

The outlet 14 has a face or end 19. Greater detail of end 19 is shown in FIG. 2. The end has sections 20 to 27 interconnected to each other by frangible connections 28. The sections, when the frangible connections are broken, remain hinged to the remainder of the outlet about connections extending along circular path 29.

A lid 17a is positioned onto an end of the container and has a lip 18a which fits over the end of the body to protect the cover 15 during transportation and storage of the container 10. When the container is positioned relative to a dispensing apparatus, the lid is removed.

Figure 3:
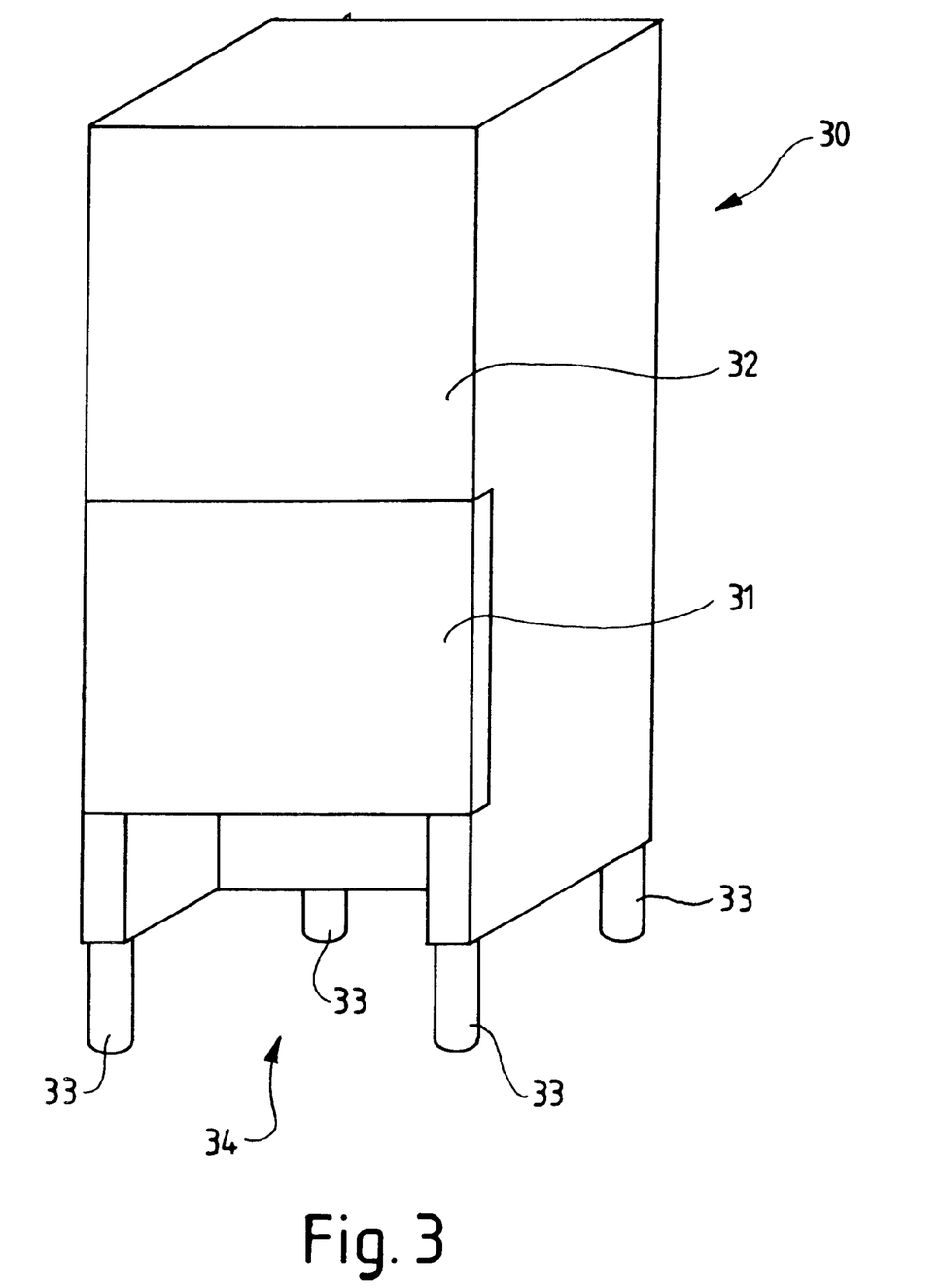
FIG. 3 is a perspective view of a housing for a dispensing apparatus according to an embodiment of the invention.

FIG. 3 shows a housing 30 for the dispensing apparatus of the invention. The housing 30 is shown viewed from the rear and has a cover or door 31 which provides access into the housing for the installation and removal of containers like that shown in FIG. 1. Refrigeration and other control equipment may be located in the upper part 32 of the housing 30. Legs 33 extend downwardly from the housing and define a space 34 for a drip tray (not shown).

Figure 4:
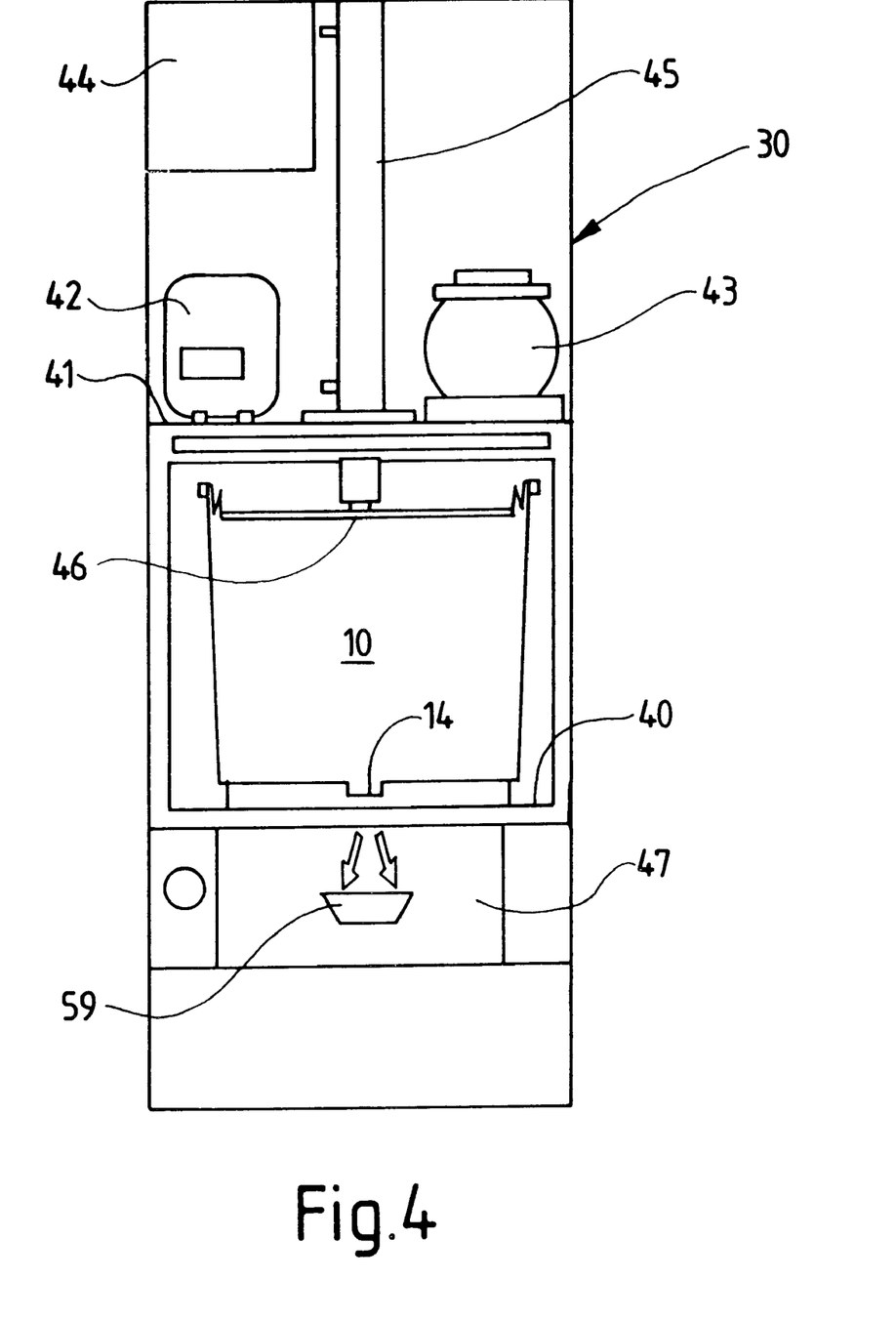
FIG. 4 is a front elevational view of details of the dispensing apparatus.

FIG. 4 shows the dispensing apparatus of an embodiment of the invention. The container 10 rests on a support surface 40 and the container 10 is positioned to present the outlet near the front of the apparatus for easy access. An upper support surface 41 defines an upper part of the apparatus. A refrigerant compressor 42, a hydraulic power pack 43 including a pump, motor and sump and a refrigeration condenser unit 44 are located within this upper part. A ram 45 extends into the lower part of the housing from the upper part and terminates in a ram member 46.

That part of the apparatus where the container is located is subjected to fan forced refrigeration to circulate cool air about the container 10 to keep it cool. A drip tray D is located below a dispensing point 47. Housing 30 consists of an insulated stainless steel cabinet with a door extending over the upper part of the cabinet to conceal the refrigeration components and over the container. A hot gas heating circuit extends around the door surround.

Figure 5:
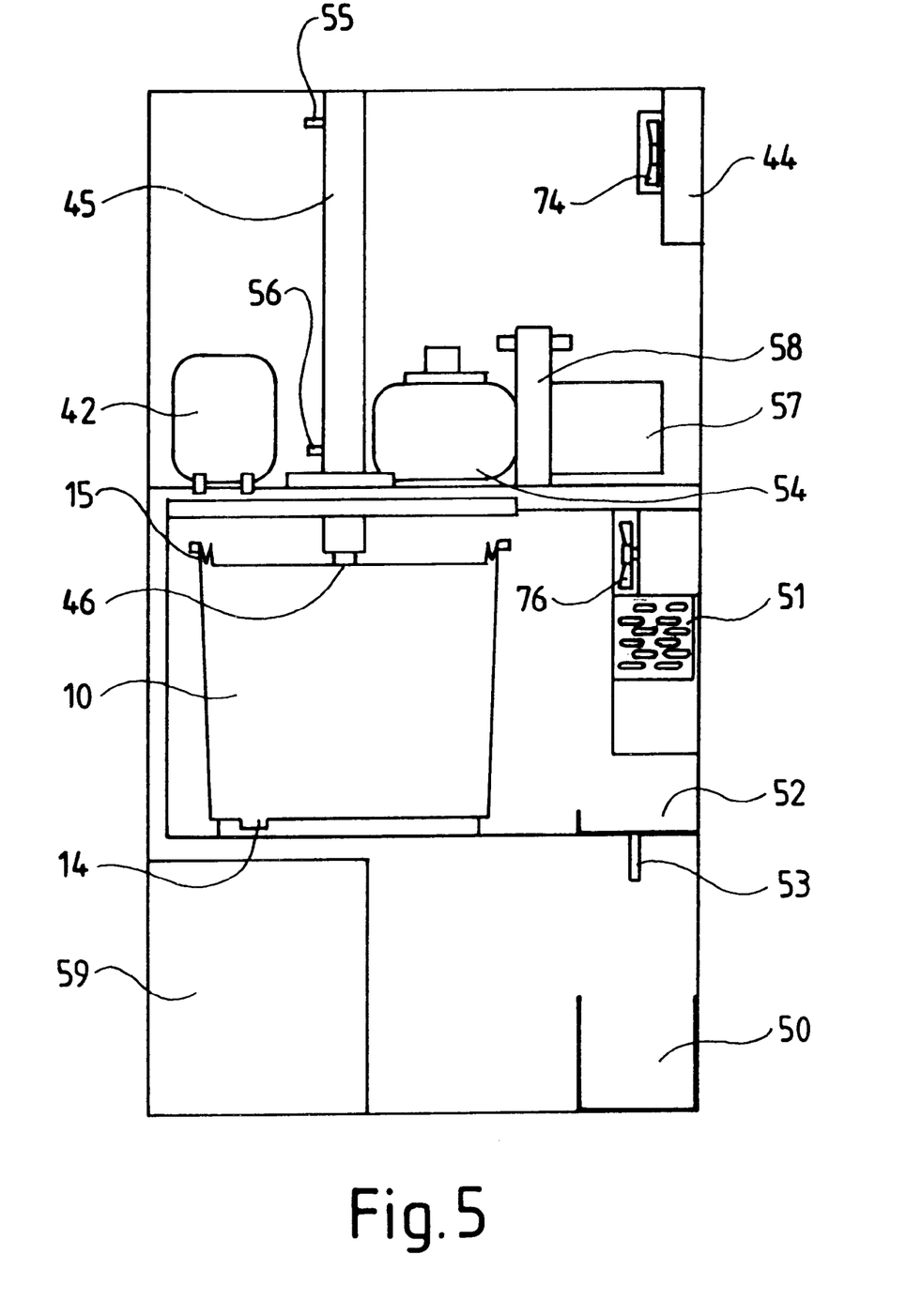
FIG. 5 is a side view of the apparatus shown in FIG. 4.

FIG. 5 shows a side view of the apparatus of FIG. 4. The apparatus has a drip tray 50 for collecting condensation from the refrigeration unit 44 and from fan forced refrigeration unit 51. A further drip tray 52 with an outlet 53 is located above tray 50.

The hydraulic power pack 43 shown in FIG. 4 is shown in greater detail in FIG. 5. The unit has a motor 54 for driving a hydraulic pump which is in fluid communication with inlet/outlets 55, 56 of the ram 45 and a sump or reservoir 57. Switching unit 58 includes solenoid units and other controls for operating the apparatus.

Fan forced refrigeration unit 51 ensures that the lower part of the apparatus where the container is housed is kept cool and also provides for hot gas defrost if required. A serving area 59 is located beneath the container outlet 14.

It should be appreciated that several units like that shown may be placed side by side and share common refrigeration units 42 and fan forced refrigeration 51, Alternatively a unitary apparatus with provision for multiple containers and multiple rams may be provided so that a variety of soft serve confections may be dispensed.

Figure 6:
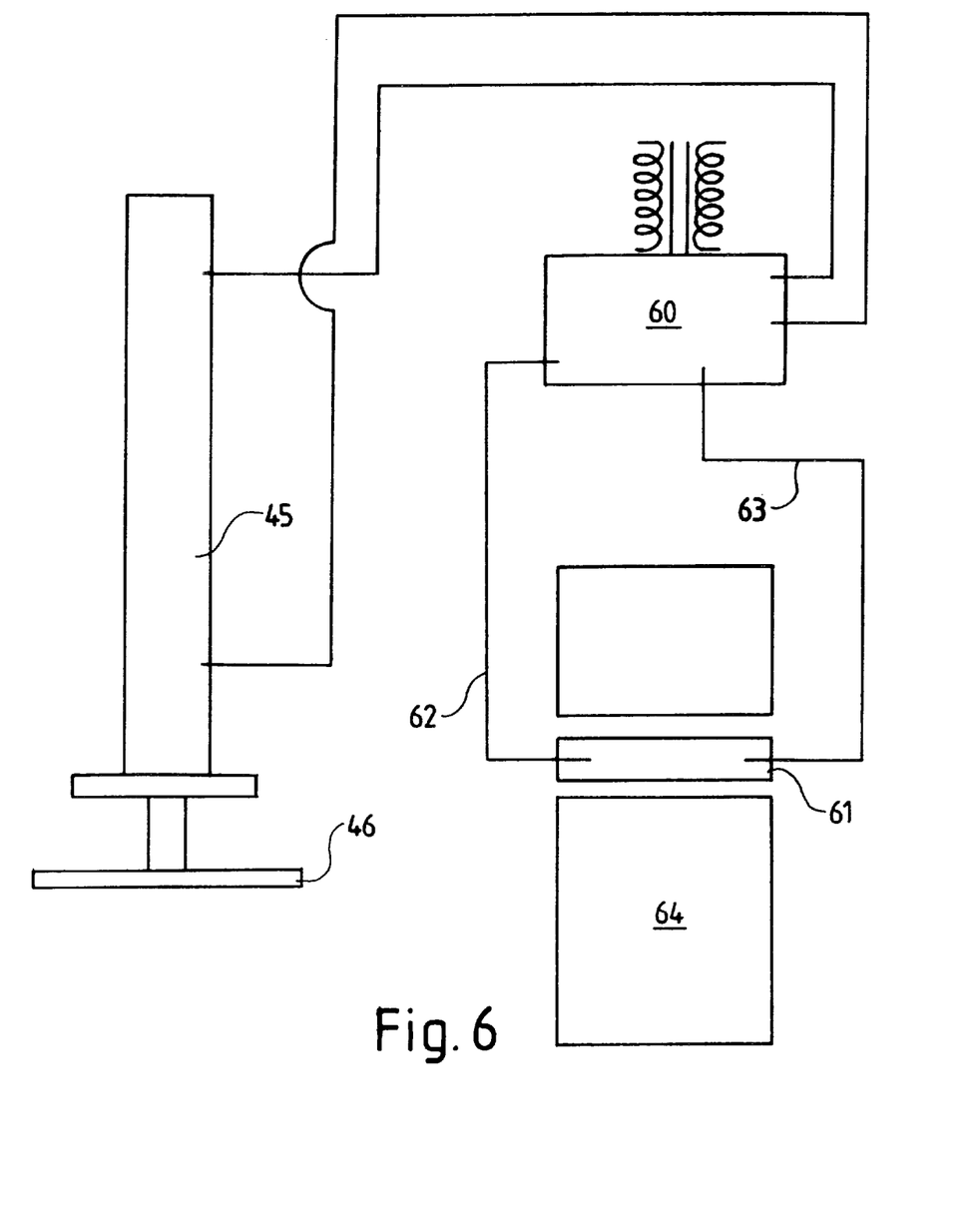
FIG. 6 shows a hydraulic control circuit for operation of the ram.

FIG. 6 shows a circuit for the hydraulic ram 45. The circuit shows that ram 45 is double acting and hydraulic pressure may be supplied to either end of the ram by solenoid controlled diverter valve 60. Valve 60 is coupled to hydraulic pump 61 which supplies hydraulic fluid to valve 60 via line 62. Line 63 returns fluid to the pump 61. Reservoir 64 maintains a supply of fluid for the pump and fluid supplied by the pump to line 62 is obtained from the reservoir. Fluid returned via line 63 is returned to the reservoir.

Figure 7:
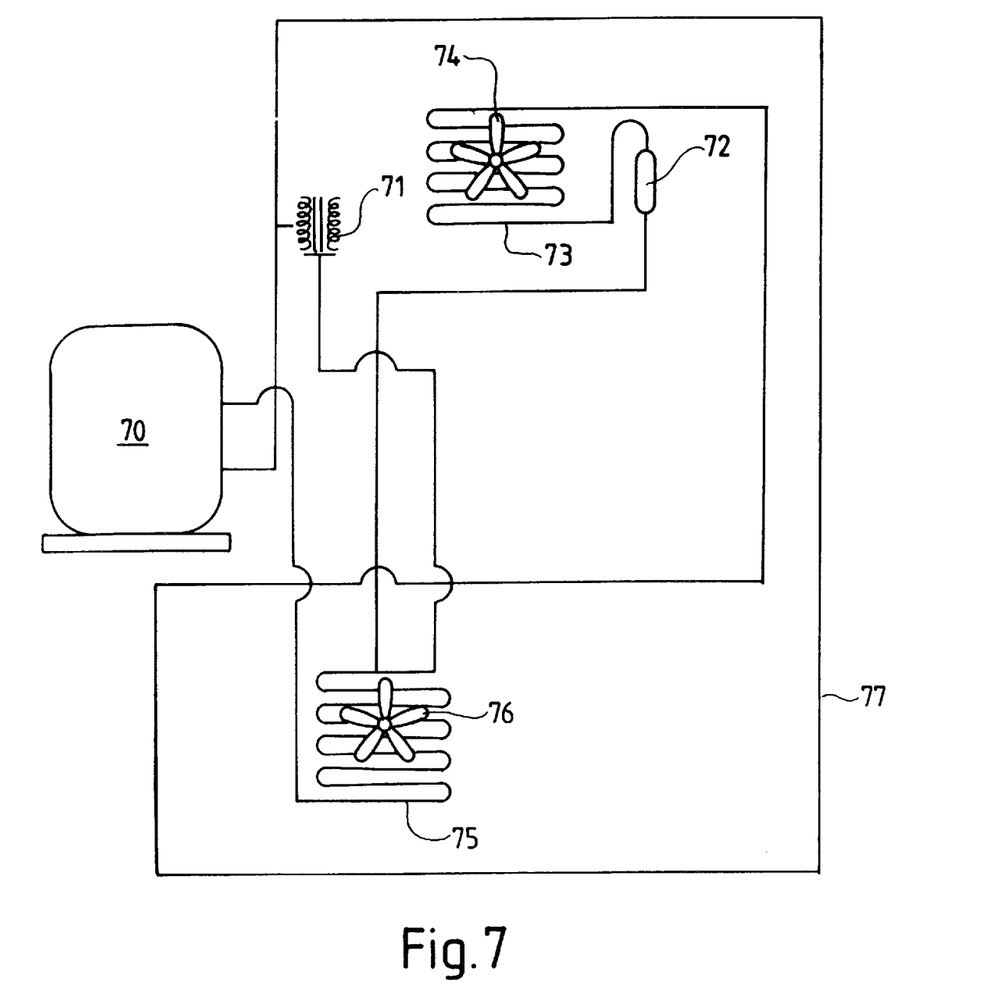
FIG. 7 shows a refrigeration circuit for cooling the interior of the dispensing apparatus.

FIG. 7 shows a refrigeration circuit. The circuit consists of a compressor 70, a hot gas solenoid 71, a filter dryer 72, a condenser 73 with a condensor fan 74 and an evaporator 75 with a fan 76. Circuit 77 provides a heating circuit for a door frame of the dispensing apparatus.

Figure 8:
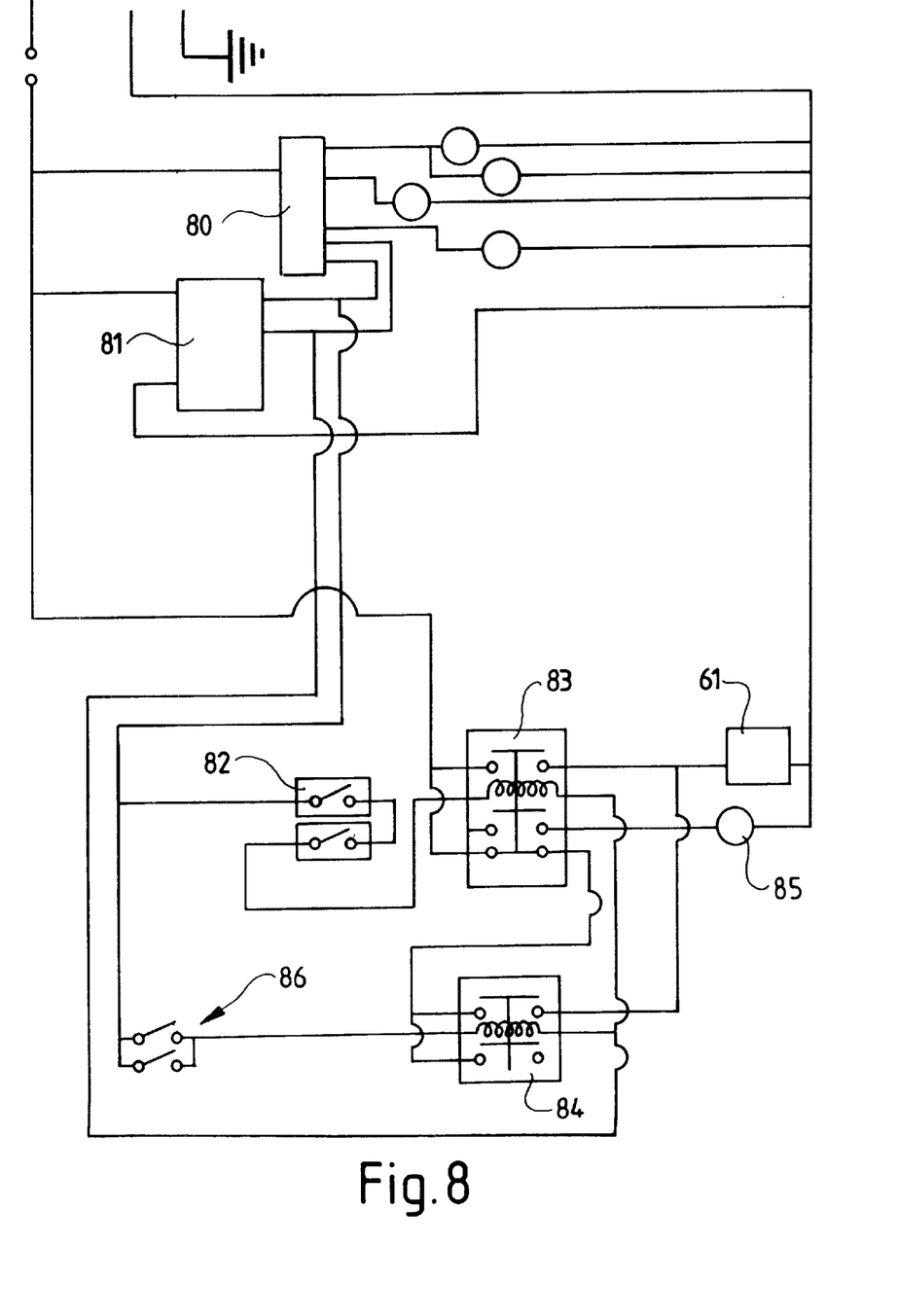
FIG. 8 shows a control circuit for operating the refrigeration circuit and the hydraulic circuits.

FIG. 8 shows an electric control circuit having a controller 80 which functions to correctly operate the compressor condenser fan, hot gas solenoid, and evaporator fan shown in FIG. 7. A step down transformer 81 provides 12 VAC for the controller 80 Start switch 82 operates pump contactor 83 to control the hydraulic pump 61. Solenoid 85 is necessary for the proper operation of the diverter valve 60. Contactor 84 is controlled by contactor 83 and manual reverse/auto plunger release switch 86 to allow the ram member to release the pressure after a dispensing operation and for manual reverse of the ram member. The manual reverse switch is operated to retract the ram member to allow an empty container to be replaced with a full one.

Figure 9:
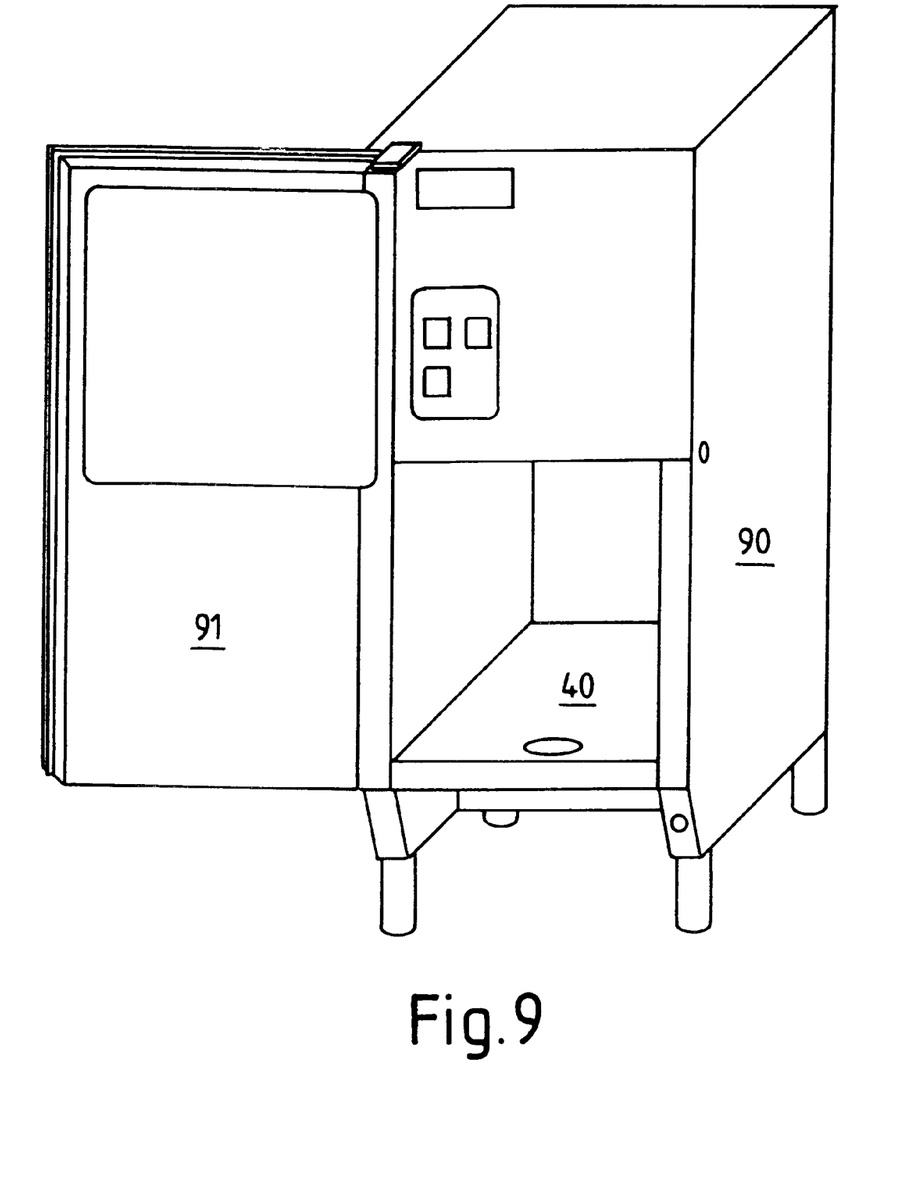
FIG. 9 shows a perspective view of a housing for the dispensing apparatus.

FIG. 9 shows housing having a cabinet 90 with a door 91. With the door 91 open a lower space is visible and a container from which the contents is to be disposed rests upon surface 40.

The apparatus of the invention operates as follows. With the ram fully retracted a full container may be positioned into the apparatus. When contents from the container are to be dispensed, the ram is operated to press against the cover of the container to cause the frangible sections in the container outlet to be separated from one another and hinge to allow contents to be dispensed.

When sufficient contents have been dispensed the ram is reversed slightly to relieve the pressure that the ram member applies to the container cover. This ensures that pressure is relieved from the contents within the container. The sections in the outlet then close off the outlet and because the container is normally under no pressure no over-run is forced from the contents and the contents do not assume a flat texture.

Once the cover has travelled down the container after further dispensing operations and the container is emptied the ram is fully retracted, the empty container removed and a fresh container is positioned within the apparatus. Only the drip trays and the serving area may require periodic cleaning.

The apparatus does not require dispensing valves since the contents are directly dispensed from the container. Since no valve is present contents with solid inclusions may easily be dispensed.

We claim:

1. A container from which the contents may be directly dispensed, the container having a body, an end wall at one end of the body, a dispensing outlet in the lower wall, a cover extending across and at the other end of the container spaced from the end wall, the body being tapered from the other end to the end wall so that the end wall has an area smaller than the area of the other end of the container, the cover having a hinged peripheral lip extending around it and directed towards the end wall and the peripheral lip remains in contact with the interior of the body as the cover is moved between a first position adjacent the other end to a final position adjacent the end wall to dispense the contents from the container.

2. The container of claim 1 wherein the container is circular in transverse cross section and the cover has a circular peripheral shape.

3. The container of claim 1 wherein the dispensing outlet is offset from a central location in the lower wall.

4. The container of claim 3 including a cap which normally seals the outlet prior to the dispensing of contents from the container.

5. The container of claim 3 wherein the outlet is provided with frangible sections normally connected to one another and severable from each other but remaining hinged to the lower wall to allow contents to be dispensed from the container.

6. The container of claim 3 wherein the outlet is provided by a rupturable membrane formed in the lower wall which when ruptured, allows the contents to be dispensed from the container.

7. The container of claim 1 including a lid fitted over the cover to shield the cover while the container is being transported or stored.

8. The container of claim 7 wherein the lid is fitted to the body by a tamper evident seal.

9. A dispensing apparatus comprising a container from which the contents may be directly dispensed, a housing, a ram, a driver, and a refrigeration system;

the container having a body, an end wall at one end of the body, a dispensing outlet in the lower wall, a cover extending across and at the other end of the container spaced from the end wall, the body being tapered from the other end to the end wall so that the end wall has an area smaller than the area of the other end of the container, the cover having a hinged peripheral lip extending around it and directed towards the end wall and the peripheral lip remains in contact with the interior of the body as the cover is moved between a first position adjacent the other end to a final position adjacent the end wall to dispense the contents from the container;

the housing having a support for the container, the container's dispensing outlet in the end wall being adjacent the support;

the ram being arranged above the support and having a ram member moveable into engagement with the cover of the container by moving from above and towards the support to dispense contents directly from the container the driver moving the ram member against the cover to dispense contents from the container and releasing pressure between the ram member and the cover after contents is dispensed from the container; and the refrigeration system cooling the interior of the housing.

10. The dispensing apparatus of claim 9 wherein the support for the container is located in a lower part of the housing and an upper part of the housing receives refrigeration components and drive means for the ram.

11. The dispensing apparatus of claim 10 having a dispensing point located below the container support surface.

12. The dispensing apparatus of claim 10 wherein the apparatus includes fan forced refrigeration located in the lower part of the housing for cooling the container.

13. The dispensing apparatus of claim 10 wherein an upper part of the housing provides a support relative to which the ram is mounted and through which the ram extends.

14. The dispensing apparatus of claim 13 wherein the upper part of the housing contains a hydraulic powerpack including a reservoir, pump and solenoid valve for supplying hydraulic fluid under pressure to the ram to provide for movement of the ram member.

15. The dispensing apparatus of claim 10 wherein the upper part of the housing contains a refrigerant circuit including a compressor and condensor unit.

* * * * *